(12) United States Patent
Pham et al.

(10) Patent No.: US 9,057,120 B2
(45) Date of Patent: Jun. 16, 2015

(54) THERMOPLASTIC FORMING METHODS FOR AMORPHOUS ALLOY

(75) Inventors: Quoc Tran Pham, Anaheim, CA (US); Theodore Andy Waniuk, Lake Forest, CA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 13/579,855

(22) PCT Filed: Feb. 17, 2011

(86) PCT No.: PCT/US2011/025273
§ 371 (c)(1),
(2), (4) Date: Aug. 22, 2012

(87) PCT Pub. No.: WO2011/103310
PCT Pub. Date: Aug. 25, 2011

(65) Prior Publication Data
US 2012/0312061 A1 Dec. 13, 2012

Related U.S. Application Data

(60) Provisional application No. 61/338,318, filed on Feb. 17, 2010.

(51) Int. Cl.
| B29C 49/66 | (2006.01) |
| B22D 27/04 | (2006.01) |
| C22C 1/00 | (2006.01) |
| C22C 45/00 | (2006.01) |

(52) U.S. Cl.
CPC .................. *C22C 1/002* (2013.01); *B29C 49/66* (2013.01); *B22D 27/04* (2013.01); *C22C 45/00* (2013.01)

(58) Field of Classification Search
CPC ............................... C22C 1/002; B29C 49/66
USPC .................................... 164/122; 264/523, 535
See application file for complete search history.

(56) References Cited

U.S. PATENT DOCUMENTS

| 3,246,062 A | 4/1966 | Scott, Jr. et al. |
| 3,882,213 A | 5/1975 | Uhlig |

(Continued)

FOREIGN PATENT DOCUMENTS

| CN | 1603445 | 4/2005 |
| JP | 2001234306 | 8/2001 |
| JP | 2001-303218 | 10/2001 |
| WO | 2009/070701 | 6/2009 |

OTHER PUBLICATIONS

Korean Intellectual Property Office, Korean Patent Application No. 10-2012-7024012, Notice of Final Rejection, mail date Oct. 28, 2014.

(Continued)

*Primary Examiner* — Kevin E Yoon
(74) *Attorney, Agent, or Firm* — Brownstein Hyatt Farber Schreck, LLP (57) ABSTRACT

Provided herein include methods of molding a parison comprising an amorphous alloy and or an amorphous alloy composites, where the molding takes place within the supercooled liquid region or around the glass transition temperature of the amorphous alloy. In one embodiment, the forming can be carried out with two fluids at different temperatures. The molded article can have a very high aspect ratio or a three-dimensional hollow shape with a desirable surface finish.

27 Claims, 5 Drawing Sheets

(56) References Cited

U.S. PATENT DOCUMENTS

| | | | |
|---|---|---|---|
| 5,288,344 | A | 2/1994 | Peker |
| 5,368,659 | A | 11/1994 | Peker |
| 5,498,390 | A | 3/1996 | Sterzel |
| 5,618,359 | A | 4/1997 | Lin |
| 5,735,975 | A | 4/1998 | Lin |
| 6,325,868 | B1 | 12/2001 | Kim |
| 6,749,415 | B2 * | 6/2004 | Boyd et al. .................... 425/143 |
| 2003/0047248 | A1 | 3/2003 | Peker |
| 2007/0013110 | A1 * | 1/2007 | Safian ........................... 264/529 |
| 2010/0327474 | A1 * | 12/2010 | Hirdina ........................... 264/39 |

OTHER PUBLICATIONS

State Intellectual Property Office of the People's Republic of China, Application No. 201180018332.7, issued Sep. 2, 2014.

State Intellectual Property Office of the People's Republic of China, Notification of the First Office Action, Chinese Patent Application No. 201180018332.7, mail date Jan. 13, 2014.

Inoue et al., "Bulk amorphous alloys with high mechanical strength and good soft magnetic properties in Fe—TM—B (TM=IV-VIII group transition metal) system", Appl. Phys. Lett., vol. 71, p. 464 (1997).

Shen et al., "Bulk Glassy CO43FE2OTA5.5B31.5 Alloy with High Glass-Forming Ability and Good Soft Magnetic Properties", Materials Transactions, vol. 42 No. 10 (2001) pp. 2136-2139.

International Search Report and Written Opinion mailed May 24, 2011, in PCT/US2011/025273.

Korean Intellectual Property Office, Korean Patent Application No. 10-2012-7024012, Notice of Preliminary Rejection (Non-Final), mail date Apr. 25, 2014.

* cited by examiner

THERMOPLASTIC FORMING METHODS FOR AMORPHOUS ALLOY

CROSS REFERENCE TO RELATED APPLICATIONS

This is the U.S. National Phase of PCT/US2011/025273, filed Feb. 17, 2011, which in turn claims priority to U.S. Provisional Application No. 61/338,318, filed Feb. 17, 2010, the contents of both of which are incorporated herein in their entirety by reference.

All publications, patents, and patent applications cited in this Specification are hereby incorporated by reference in their entirety.

BACKGROUND

Bulk-solidifying amorphous alloys have been made in a variety of metallic systems. They are generally prepared by quenching from above the melting temperature to the ambient temperature. Generally, high cooling rates such as one on the order of $10^{5}$° C./sec, are needed to achieve an amorphous structure. The lowest rate by which a bulk solidifying alloy can be cooled to avoid crystallization, thereby achieving and maintaining the amorphous structure during cooling, is referred to as the "critical cooling rate" for the alloy. In order to achieve a cooling rate higher than the critical cooling rate, heat has to be extracted from the sample. Thus, the thickness of articles made from amorphous alloys often becomes a limiting dimension, which is generally referred to as the "critical (casting) thickness." A critical thickness of an amorphous alloy can be obtained by heat-flow calculations, taking into account the critical cooling rate.

Until the early nineties, the processability of amorphous alloys was quite limited, and amorphous alloys were readily available only in powder form or in very thin foils or strips with a critical thickness of less than 100 micrometers. A class of amorphous alloys based mostly on Zr and Ti alloy systems was developed in the nineties, and since then more amorphous alloy systems based on different elements have been developed. These families of alloys have much lower critical cooling rates of less than $10^{3}$° C./sec, and thus they have much larger critical casting thicknesses than their previous counterparts. However, little has been shown regarding how to utilize and/or shape these alloy systems into structural components, such as those in consumer electronic devices. In particular, pre-existing forming or processing methods often result in high product cost when it comes to high aspect ratio products (e.g., thin sheets) or three-dimensional hollow products. Moreover, the pre-existing methods can often suffer the drawbacks of producing products that lose many of the desirable mechanical properties as observed in an amorphous alloy.

Thus, a need exists to develop methods that permit fabrication and processing of products made of amorphous alloys, particularly when the products desire a high aspect ratio or low thickness in general.

SUMMARY

Provided herein include methods of molding a composition comprising an amorphous alloy and or an amorphous alloy composite, where the molding takes place within a supercooled liquid region or around a glass transition temperature of the amorphous alloy. In one embodiment, the forming can be carried out with two fluids at different temperatures. The molded article can have a very high aspect ratio or a three-dimensional hollow shape with desirable surface finish.

One embodiment provides a method of forming an article, the method comprising: providing in a mold a composition having a first shape, the composition being at least partially amorphous and having a glass transition temperature Tg and a crystallization temperature Tx; providing a first fluid at a first temperature that is below Tx and a second fluid at a second temperature that is below the first temperature; molding the composition into a second shape by having the first fluid contact at least a portion of the composition; and cooling the composition to form the article having the second shape by replacing as least some of the first fluid with the second fluid.

Another embodiment provides a method of forming an article, the method comprising: heating a first fluid to a first temperature and at least one of (i) a second fluid and (ii) a composition having a first shape to a second temperature that is below the first temperature, wherein the composition is at least partially amorphous and has a glass transition temperature Tg and a crystallization temperature Tx, and wherein the first temperature is below Tx; molding the composition into a second shape by having the first fluid contact at least a portion of the composition; and cooling the composition to form the article having the second shape by replacing as least some of the first fluid with the second fluid.

An alternative embodiment provides a method of forming an article, the method comprising: providing a composition in a mold, the composition being at least partially amorphous and having a glass transition temperature Tg and a crystallization temperature Tx; heating a first fluid to a first temperature that is below Tx and at least one of (i) a second fluid, (ii) the mold, and (iii) the composition to a second temperature that is below the first temperature, wherein the second temperature is below Tg; molding the composition by having the first fluid contact at least a portion of the composition; cooling the composition to form the article by replacing as least some of the first fluid with the second fluid; and removing at least some of the second fluid.

DETAILED DESCRIPTION

An embodiments herein relates to a method of forming molded articles, thin sheet, casings, high aspect ratio parts, or hollow articles comprising: providing a feed stock of amorphous alloy having glass transition (Tg), and a crystallization temperature (Tx), where the difference between Tg and Tx defines a supercooled temperature region (ΔT); heating the first fluid and the mold to a molding temperature and a second fluid to temperature below a molding temperature; molding the feedstock using the first fluid; replacing the first fluid with a second fluid; and removing the second fluid.

Another embodiment relates to method of forming molded articles, thin sheet, casings, high aspect ratio parts, or hollow articles comprising: providing a feed stock of amorphous alloy having glass transition (Tg), and a crystallization temperature (Tx), where the difference between Tg and Tx defines a supercooled temperature region (ΔT); heating the first fluid to a molding temperature; heating a second fluid and the mold to temperature below a molding temperature; molding the feedstock using the first fluid; replacing the first fluid with a second fluid; and removing the second fluid.

Yet another embodiment relates to a method of forming molded articles, thin sheet, casings, high aspect ratio parts, or hollow articles comprising: providing a feed stock of amorphous alloy having glass transition (Tg), and a crystallization temperature (Tx), where the difference between Tg and Tx defines a supercooled temperature region (ΔT); heating the first fluid to a molding temperature; heating a second fluid, the amorphous alloy, and the mold to temperature below a molding temperature; molding the feedstock using the first fluid replacing the first fluid with a second fluid; and removing the second fluid.

In one embodiment, the second fluid is displaced by a third fluid at temperature below a molding temperature.

In one embodiment, the amorphous alloy and the mold can be at any temperature.

The amorphous alloy could be described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

The amorphous alloy could be described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

The molded articles could be thin sheet, casing, high aspect ratio part, or hollow article, wherein the amorphous alloy is platinum-based.

The molded articles could be thin sheet, casing, high aspect ratio part, or hollow article, wherein the amorphous alloy is palladium-based.

The molded articles could be thin sheet, casing, high aspect ratio part, or hollow article, wherein the amorphous alloy is gold-based.

The molded articles could be thin sheet, casing, high aspect ratio part, or hollow article, wherein the amorphous alloy is silver-based.

The molded articles could be thin sheet, casing, high aspect ratio part, or hollow article, wherein the amorphous alloy is Zr/Ti-based.

The molded articles could be thin sheet, casing, high aspect ratio part, or hollow article, wherein the amorphous alloy is Zr-based.

The molded articles could be thin sheet, casing, high aspect ratio part, or hollow article, wherein the amorphous alloy is Zr/Ti-based with no Ni.

The molded articles could be thin sheet, casing, high aspect ratio part, or hollow article, wherein the amorphous alloy is Zr/Ti base with no Al.

The molded articles could be thin sheet, casing, high aspect ratio part, or hollow article, wherein the amorphous alloy is Zr/Ti-based with no Be.

The molded articles could be thin sheet, casing, high aspect ratio part, or hollow article, wherein the amorphous alloy is Cu-based.

The molded articles could be thin sheet, casing, high aspect ratio part, or hollow article, wherein the amorphous alloy is Fe-based.

The molded articles could be thin sheet, casing, high aspect ratio part, or hollow article, wherein the mold side is under vacuum and the other side is exposed to fluid(s) under pressure.

The molded articles could be thin sheet, casing, high aspect ratio part, or hollow article, wherein the amorphous alloy is formed under inert atmosphere.

The molded articles could be thin sheet, casing, high aspect ratio part, or hollow article, wherein the amorphous alloy is formed under partial vacuum.

The molded articles could be thin sheet, casing, high aspect ratio part, or hollow article, wherein the amorphous alloy can be formed one or more times.

The molded articles could be thin sheet, casing, high aspect ratio part, or hollow article, wherein the mold, the tools, the part(s) can also be made of amorphous alloy or composite containing amorphous alloy.

Amorphous Alloy

The term "amorphous" herein can refer to a lack of long-range order in the microstructure of a material; in other words, the material generally exhibits only short-range order in its microstructure. The term "amorphous" can also be used together with the term "phase," as in describing a material or composition of an amorphous phase or having an amorphous phase—the term "phase" can refer to one that can be found in a thermodynamic phase diagram. Accordingly, an amorphous metal or amorphous alloy can refer to a metal-element-containing material exhibiting only a short range order in its microstructure—the term "element" throughout this Specification refers to the element found in a Periodic Table. Because of the short-range order, an amorphous material can sometimes be described as "glassy." Thus, an amorphous metal or alloy can sometimes be referred to as "metallic glass," or "Bulk Metallic Glass" (BMG).

A material can have an amorphous phase, a crystalline phase, or both. The amorphous and crystalline phases can have the same chemical composition and differ only in the microstructure—i.e., one amorphous and the other crystalline. Alternatively, the two phases can have different chemical compositions and microstructure. For example, a composition can be partially amorphous, substantially amorphous, or completely amorphous. A partially amorphous composition can refer to a composition at least about 5 vol % of which is of an amorphous phase, such as at least about 10 wt %, such as at least 20 vol %, such as at least about 40 vol %, such as at least about 60 vol %, such as at least about 80 vol %, such at least about 90 vol %. The terms "substantially" and "about" have been defined elsewhere in this Specification. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. The term homogenous can be used to describe both the chemical composition and macroscopic microstructure in the composition. For example, a composition that is homogeneous with respect to an amorphous alloy can refer to one having an amorphous phase uniformly distributed throughout its microstructure. In other words, the composition microscopically can consist essentially of an amorphous phase. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or different chemical composition. In one embodiment, they have substantially the same chemical composition.

The methods described herein can be applicable to any type of amorphous alloys or alloy systems. Similarly, the amorphous alloys described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, or combinations thereof. For example, the alloy can include any combination of these elements in its chemical formula or chemical composition. The elements can be present at different weight or volume percent. For example, an iron "based" alloy can refer to an alloy having a non-insignificant weight percentage of iron present therein, the weight percent can be, for example, at least about 10 wt %, such as at least about 20 wt %, such as at least about 40 wt %, such as at least 50 wt %, such as at least about 60 wt %. Alternatively, in one embodiment, the aforedescribed percentages can be volume percentages instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. In some embodiments, the alloy, or the composition including the alloy, can be substantially free of nickel, aluminum, or beryllium, or combinations thereof. In one embodiment, the alloy or the composite is completely free of nickel, aluminum, or beryllium, or combinations thereof.

For example, the amorphous alloy can have the chemical formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the chemical formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the chemical formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy systems is a Zr—Ti—Ni—Cu—Be based amorphous alloy under the trade name Vitreloy, such as Vitreloy-1 and Vitreloy-101, fabricated by Liquidmetal Technologies, CA, USA. Some non-limiting examples of amorphous alloys of the different systems that can be used are provided in Table 1.

The amorphous alloys can also be ferrous alloys, such as (Fe, Ni, Co) based alloys. Some examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 20012627/(Pub. No. 2001303218 A). One exemplary composition is $Fe_{72}Al_5Ga_2P_{11}C_6B_4$. Another example is $Fe_{72}Al_7Zr_{10}Mo_5W_2B_{15}$.

TABLE 1

Some exemplary amorphous alloy compositions.

| Alloy | Atm % | Atm % | Atm % | Atm % | Atm % | Atm % |
|---|---|---|---|---|---|---|
| 1 | Zr | Ti | Cu | Ni | Be | |
| | 41.20% | 13.80% | 12.50% | 10.00% | 22.50% | |
| 2 | Zr | Ti | Cu | Ni | Be | |
| | 44.00% | 11.00% | 10.00% | 10.00% | 25.00% | |
| 3 | Zr | Ti | Cu | Ni | Nb | Be |
| | 56.25% | 11.25% | 6.88% | 5.63% | 7.50% | 12.50% |
| 4 | Zr | Ti | Cu | Ni | Al | Be |
| | 64.75% | 5.60% | 14.90% | 11.15% | 2.60% | 1.00% |
| 5 | Zr | Ti | Cu | Ni | Al | |
| | 52.50% | 5.00% | 17.90% | 14.60% | 10.00% | |
| 6 | Zr | Nb | Cu | Ni | Al | |
| | 57.00% | 5.00% | 15.40% | 12.60% | 10.00% | |
| 7 | Zr | Cu | Ni | Al | Sn | |
| | 50.75% | 36.23% | 4.03% | 9.00% | 0.50% | |
| 8 | Zr | Ti | Cu | Ni | Be | |
| | 46.75% | 8.25% | 7.50% | 10.00% | 27.50% | |
| 9 | Zr | Ti | Ni | Be | | |
| | 21.67% | 43.33% | 7.50% | 27.50% | | |
| 10 | Zr | Ti | Cu | Be | | |
| | 35.00% | 30.00% | 7.50% | 27.50% | | |
| 11 | Zr | Ti | Co | Be | | |
| | 35.00% | 30.00% | 6.00% | 29.00% | | |
| 12 | Au | Ag | Pd | Cu | Si | |
| | 49.00% | 5.50% | 2.30% | 26.90% | 16.30% | |
| 13 | Au | Ag | Pd | Cu | Si | |
| | 50.90% | 3.00% | 2.30% | 27.80% | 16.00% | |
| 14 | Pt | Cu | Ni | P | | |
| | 57.50% | 14.70% | 5.30% | 22.50% | | |
| 15 | Zr | Ti | Nb | Cu | Be | |
| | 36.60% | 31.40% | 7.00% | 5.90% | 19.10% | |
| 16 | Zr | Ti | Nb | Cu | Be | |
| | 38.30% | 32.90% | 7.30% | 6.20% | 15.30% | |
| 17 | Zr | Ti | Nb | Cu | Be | |
| | 39.60% | 33.90% | 7.60% | 6.40% | 12.50% | |
| 18 | Cu | Ti | Zr | Ni | | |
| | 47.00% | 34.00% | 11.00% | 8.00% | | |
| 19 | Zr | Co | Al | | | |
| | 55.00% | 25.00% | 20.00% | | | |

The aforedescribed amorphous alloy systems can further include additional elements, such as additional transition metal elements, including Nb, Cr, V, Co. The additional elements can be present at less than or equal to about 30 wt %, such as less than or equal to about 20 wt %, such as less than or equal to about 10 wt %, such as less than or equal to about 5 wt %.

In some embodiments a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the composition consists essentially of the amorphous alloy (with only small incidental amount of impurities). In another embodiment, the composition consists of the amorphous alloy (with no observable trace of impurities).

Amorphous alloy systems can exhibit several desirable properties. For example, they can have a high hardness and/or hardness; a ferrous-based amorphous alloy can have particularly high yield strength and hardness. In one embodiment, an amorphous alloy can have a yield strength of about 200 ksi or higher, such as 250 ksi or higher, such as 400 ksi or higher, such as 500 ksi or higher, such as 600 ksi or higher. With respect to the hardness, in one embodiment, amorphous metal alloys can have a hardness value of above about 400 Vickers-100 mg, such as above about 450 Vickers-100 mg, such as above about 600 Vickers-100 mg, such as above about 800 Vickers-100 mg, such as above about 1000 Vickers-100 mg, such as above about 1100 Vickers-100 mg, such as above about 1200 Vickers-100 mg. An amorphous alloy can also have a very high elastic strain limit, such as at least about 1.2%, such as at least about 1.5%, such as at least about 1.6%, such as at least about 1.8%, such as at least about 2.0%. Amorphous alloys can also exhibit high strength-to weight ratios, particularly in the case of, for example, Ti-based and Fe-based alloys. They also can have high resistance to corrosion and high environmental durability, particularly, for example, the Zr-based and Ti-based alloys.

Characteristic Temperatures

An amorphous alloy can have several characteristic temperatures, including glass transition temperature $T_g$, crystallization temperature $T_x$, and melting temperature $T_m$. In some embodiments, each of $T_g$, $T_x$, and $T_m$, can refer to a temperature range, instead of a discrete value; thus, in some embodiments the term glass transition temperature, crystallization temperature, and melting temperature are used interchangeably with glass transition temperature range, crystallization temperature range, and melting temperature range, respectively. These temperatures are commonly known and can be measured by different techniques, one of which is Differential Scanning Calorimetry (DSC), which can be carried out at a heating rate of, for example, about 20° C./min.

In one embodiment, as the temperature increases, the glass transition temperature $T_g$ of an amorphous alloy can refer to the temperature, or temperature ranges in some embodiments, at which the amorphous alloy begins to soften and the atoms become mobile. An amorphous alloy can have a higher heat capacity above the glass transition temperature than it does below the temperature, and thus this transition can allow the identification of $T_g$. With increasing temperature, the amorphous alloy can reach a crystallization temperature $T_x$, at which crystals begin to form. As crystallization in some embodiments is generally an exothermic reaction, crystallization can be observed as a dip in a DSC curve and $T_x$ can be determined as the minimum temperature of that dip. An exemplary $T_x$ for a Vitreloy can be, for example, about 500° C., and that for a platinum-based amorphous alloy can be, for example, about 300° C. For other alloy systems, the $T_x$ can be higher or lower. It is noted that at the $T_x$, the amorphous alloy is generally not melting or melted, as $T_x$ is generally below $T_m$.

Finally, as the temperature continues to increase, at the melting temperature $T_m$, the melting of the crystals can begin. Melting is an endothermic reaction, wherein heat is used to melt the crystal with minimal temperature change until the crystals are melted into a liquid phase. Accordingly, a melting transition can resemble a peak on a DSC curve, and $T_m$ can be observed as the temperature at the maximum of the peak. For an amorphous alloy, the temperature difference $\Delta T$ between $T_x$ and $T_g$ can be used to denote a supercritical region (i.e., a "supercritical liquid region," or a "supercritical region"), wherein at least a portion of the amorphous alloy retains and exhibits characteristics of an amorphous alloy, as opposed to a crystalline alloy. The portion can vary, including at least 40 wt %, at least 50 wt %, at least 60 wt %, at least 70 wt %, at least 80 wt %, at least 90 wt %, at least 99 wt %; or these percentages can be volume percentages instead of weight percentages.

Parison

The parison is an unshaped mass of material such as a metal or glass before it is molded into its final form. An example of a parison is a hollow tube such as that extruded from a die head and used in a blow molding machine so as to be expanded within a mold. The parison could be a tube-like piece of the material with a hole in one end in which a fluid such as oil, molten metal or compressed air can pass through. A parison can be made by melting down a material and forming it into the shape of the parison.

Blow Molding

Embodiments of the molding process include blow molding, also known as blow forming, is a manufacturing process by which hollow parts are formed. In general, there are three main types of blow molding: extrusion blow molding, injection blow molding, and stretch blow molding. The blow molding process begins with a parison or preform. The parison could be clamped into a mold and one or more fluid could pumped into it. For example, a first fluid could push the deformable parison material out to match the mold. Then, a second fluid could cool the expanded parison material and harden it within the mold, which would open up and an article would be ejected from the mold. In one embodiment, the first and second fluids could be the same, e.g., oil, expect that the first fluid could be at a higher temperature to allow for the deformation of the parison and shape it to match the mold and the second fluid could be at a lower temperature to cool the expanded parison material and harden it within the mold. In another embodiment, the first fluid and the second fluid could be different, e.g., molten metal and oil.

Article

The articles produced as a result of the presently described forming/molding process can have a high aspect ratio and/or can have a hollow shape, such as a three-dimensional hollow shape. An aspect ratio part in one embodiment herein refers to any part that has a width of at least twice the thickness.

In one embodiment, the aspect ratio of the part can be at least about 5, such as at least about 10, such as at least about 15, such as at least about 20, such as at least about 25, such as at least about 30, such as at least about 40, such as at least about 50, such as at least about 60, such as at least about 80, such as at least about 100, such as at least about 200. For example, the article can be a thin sheet, with a thickness that is much smaller than its length or width. Alternatively, the article can be a hollow article, such as one having at least a cavity.

Depending on the application, the thickness of the article can be any value. For example, the thickness can be less than about 10 cm, such as less than about 5 cm, such as less than about 1 cm, such as less than about 5 mm, such as less than about 2 mm, such as less than about 1 mm, such as less than about 500 microns, such as less than about 200 microns, such as less than about 100 microns, such as less than about 50 microns, such as less than about 20 microns, such as less than about 10 microns, such as less than about 1 micron. Alternatively, if desired, the thickness of the article can be greater than about 10 cm, such as greater than about 15 cm, such as greater than about 20 cm.

The molded article made of the amorphous alloy composition by the presently described methods can have several unexpected advantages. In addition to maintaining the superior mechanical, chemical properties of the amorphous alloys in the final product as described above, the presently described molding further allows high aspect ratio parts or hollow parts comprising the amorphous alloys to be made. Additionally, the articles manufactured by the presently described methods can have fairly uniform thickness. In one embodiment, the standard deviation of thickness of the article as measured at different (e.g., three or more) points of the article can be less than about 15%, such as less than about 10%, such as less than about 5%, such as less than about 2%, such as less than about 1%, such as less than about 0.5%. Also, because the relatively low temperature needed for the molding process and the fairly low need for further processing of the product, the foregoing properties can allow fairly inexpensive mass production of the molding articles described herein.

The molded article can have a near net shape. A "near net-shape" herein refers to 90% or closer, 95% or closer, such as 97% or closer, to the final geometry of the final product. In one embodiment, this near net shape property can provide an unexpected advantage of needing minimal post-processing. Additionally, the molded article can be in an intimate contact with the mold. This can be particularly useful when the mold is also a part of the final product and an intimate contact is desired. An intimate contact can refer to being in at least substantially complete contact, such as in complete contact. Generally, such a contact refers to a lack of gap between the molded article and the surface of the part/substrate. Various metrics can be used to describe the levels or degrees of complete contact. One of these is the impermeability of a fluid. In one embodiment, the molded article is at least partially impermeable, such as at least substantially impermeable, such as completely impermeable to fluid, including water (i.e., "waterproof") or air (i.e., "air-tight"). The fluid can also include body fluid, such as blood, saliva, urine, or corrosive fluid, such as acidic or basic fluid, such as one that contains chloride ions. In one embodiment, the article can create a seal that permits less than 1000 ppm, such as less than about 500 ppm, such as less than about 200 ppm, such as less than about 100 ppm, such as less than about 50 ppm, such as less than about 10 ppm, to pass through or penetrate the molded article from one side of the molded article to the other. The passage takes into account the passage through the article itself and any gap present between the article and the surface of the mold.

Forming an Amorphous Alloy Article

Because of their desirable properties, amorphous alloys can be used in a variety of applications, including forming an interfacial layer on a substrate that is in intimate contact with the substrate or as a bonding element to bond more than one part together. The term "forming" can refer to shaping a composition into a desired or predetermined configuration. As will be discussed further below, forming can include, but is not limited to, thermoplastic forming, thermoplastic extrusion, thermoplastic shearing, soldering, over-molding, and overcastting. The process of forming can take place while a composition is disposed onto a desired location, such as a surface of a substrate, which can be, for example, a part of a mold.

Figure 1:
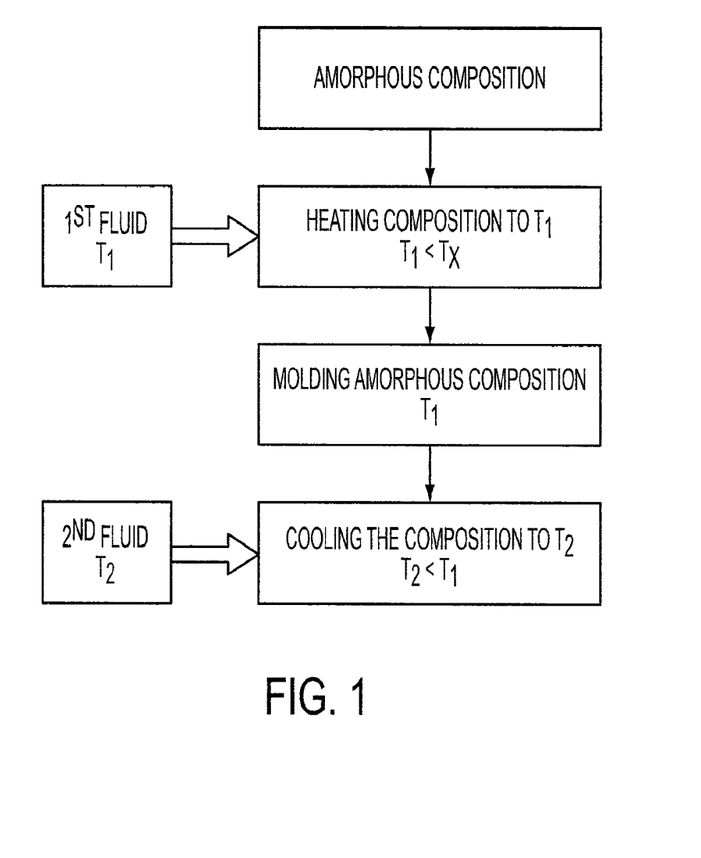
FIG. 1 provides an illustrative schematic flow diagram showing the process of forming a molded article in one embodiment.
Figure 2:
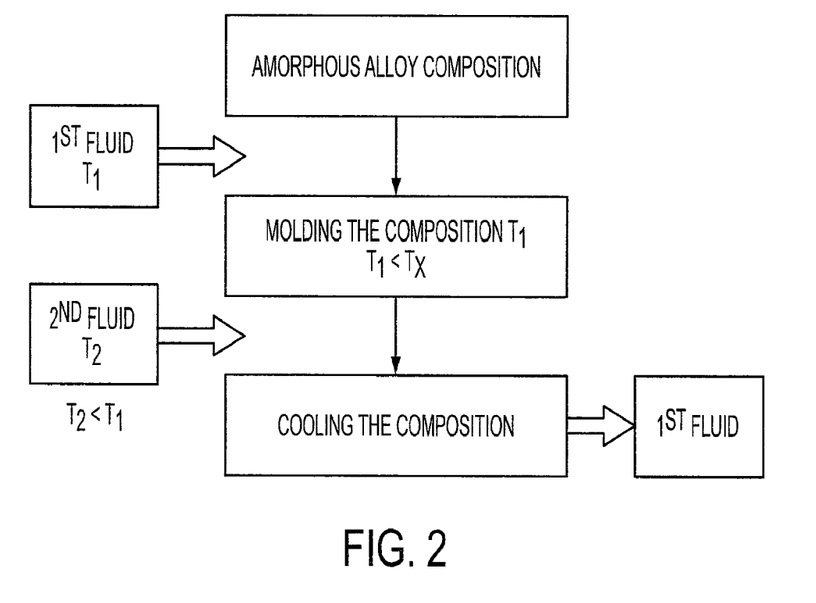
FIG. 2 provides an illustrative schematic flow diagram showing the process of forming a molded article in one alternative embodiment.
Figure 3A:
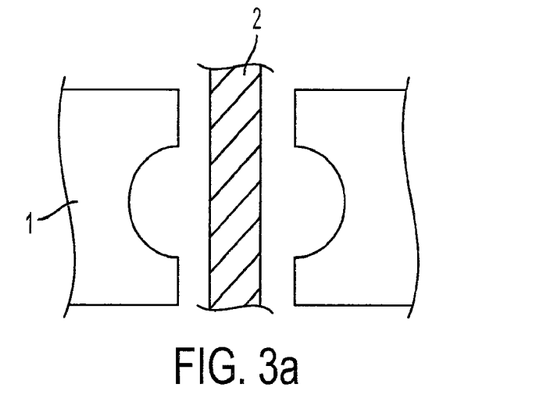
FIGS. 3(a)-3(c) are schematics illustrating the shape forming during the molding process in one embodiment: the relative location between the composition and the mold is shown in (a), the molding processing showing an article of the composition being formed on the surface of the mold is shown in (b), and finally a free-standing molded article detached from the mold is shown in (c).
Figure 3B:
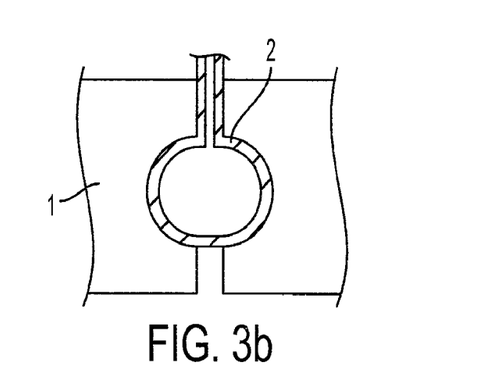
Figure 3C:
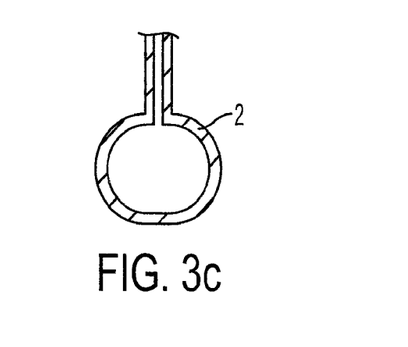

In one embodiment wherein a mold is involved in the shaping process, the term "forming" can also refer to "molding." For example, an alloy composition having a first shape can be molded into a second shape, and the second shape can substantially conform to the shape of the mold or the cavity thereof. FIGS. 1 and 2 provide flow charts showing two exemplary forming processes. The forming processes will be discussed in detail below. A mold need not be involved during molding. For example, an amorphous alloy can be molded by a fluid (or fluids) without involving a mold. One non-limiting example of such a process would be similar to blowing a glass vase. FIGS. 3(a)-3(c) illustrate the shape forming during the molding process in one embodiment. An alloy composition 2 can have a linear shape, as shown in FIG. 3(a). During the molding process, the composition 2 begins to take the shape of the inner cavity of the mold 1, as shown in FIG. 3(b). As a result, upon completion of the molding process and the removal of the mold, the composition can take and/or retain an outer shape that can substantially conform to the shape of the mold; FIG. 3(c). The final product can be a hollow article, as shown in FIG. 3(c).

Composition

The composition used in the molding process can be one that is at least partially amorphous, the composition having a glass transition temperature Tg and a crystallization temperature Tx. The amorphous alloy can be any of the amorphous alloy systems described above. The term "amorphous alloy composition" can refer to a composition that comprises an alloy that is at least substantially amorphous, a composite comprising an alloy at least substantially amorphous, or both. As will be described in detail below, the molding process can be carried out in the supercooled region of the amorphous alloy and can be carried out with two fluids at different temperatures. In one alternative embodiment, the method of molding an amorphous alloy composition can further include a method of making an amorphous alloy composition from an alloy feedstock that is not amorphous.

The composition to be molded can be at least partially amorphous, such as at least substantially amorphous, such as completely amorphous. The references to "at least partially amorphous" and "at least substantially amorphous" are as described above. The composition can include any of the aforedescribed amorphous alloy systems. For example, the composition can include an alloy that is at least substantially amorphous, a composite having an alloy at least substantially amorphous, or a combination thereof. In one embodiment, the composition can be homogeneous with respect to amorphous alloy in that the composition can consist essentially of an amorphous alloy with some incidental impurities, or the composition can consist of the amorphous alloy. Alternatively, the composition can include a composite that includes an amorphous alloy or an alloy that is at least substantially amorphous. For example, the composite can have a matrix of an amorphous phase with a crystalline phase dispersed therein. The chemical composition of the amorphous phase and the crystalline phase in the composite can be the same or different. The crystalline phase can have a dendritic structure. In one embodiment, the composite has crystalline dendrites dispersed in an amorphous alloy matrix.

The composition before heating can be in any shape or size. For example, it can be shots, a sheet, a plate, a cylinder, a cube, a rectangular box, a sphere, an ellipsoid, a polyhedron, or an irregular shape, or anything in between. In one embodiment, the composition is in a form of a plurality of particles, which can be spherical, wire-like, flake-like, sheet-like, rod-like, or anything in between. The initial shape of the composition can be independent of that of the mold and/or of the final molded product. For example, if the composition before the molding process has a first shape and the final product has a second shape, the first shape and the second shape can be the same or different. Similarly, if the molding cavity (the space where the molding of the composition takes place) of the mold has a third shape, the first shape and the third shape can be the same or different. In some embodiments, however, the second shape (of the final product) can substantially conform to the third shape (of the mold). FIGS. 3(a)-3(c) illustrate an exaggerated molding process in which the shape of the composition changes from a first shape (i.e., sphere) to a second shape (i.e., thin sheet), which conforms to the shape of the cavity of the mold (i.e., third shape).

Before heating the composition to the desired temperature for the molding step to commence, the composition can be located in the mold cavity or outside of the mold cavity. In one embodiment where the composition is in the mold, the composition can be heated and molded while simultaneously being in the mold. Alternatively, in an embodiment wherein the composition is not in the mold, the composition can be heated thereafter to begin the molding step, or be heated while simultaneously being injected into the mold and the molding step taking place.

The amorphous phase (i.e., amorphous alloy) within the composition can be made by any suitable pre-existing method. In one embodiment, the method of making the composition as raw material to be molded can include first heating an alloy feedstock to melt the feedstock and then rapid-cool the heated feedstock to the supercooled region of the alloy such that the alloy becomes at least partially amorphous. The additional steps can include (1) providing an alloy feedstock; heating the feedstock to a first temperature above a melting temperature Tm of the feedstock; and (3) quenching the heated feedstock to a second temperature below a glass transition temperature Tg of the feedstock to form a composition of the alloy, which composition is at least partially amorphous. The formed composition can then undergo the afore-described molding methods. An embodiment of forming an molded article that includes a step of making amorphous composition. The final molded product may have at least one dimension that is greater than the critical casting thickness of the amorphous alloy composition thereof.

The alloy in the feedstock can be of any type, and it can be amorphous or crystalline, or both. In one embodiment, the feedstock is at least partially amorphous, such as at least substantially amorphous, such as entirely amorphous. In another embodiment, the feedstock is substantially not amorphous, such as it is at least partially crystalline, such as at least substantially crystalline, such as it is entirely crystalline.

The feedstock can also be of any size and shape. For example, it can be sheet-like, flak-like, rod-like, wire-like, particle-like, or anything in between. The techniques of making amorphous alloy from crystalline alloys are known, and any of the known methods can be employed hereinto to fabricate the composition. Although different examples of methods of forming are described here, other similar forming processes or combinations of such can also be used. In one embodiment, the feedstock is heated to a first temperature that is above the melting temperature Tm of the alloy in the feedstock such that any crystals in the alloy can be melted. The heated and melted feedstock can then be rapid-cooled (or "quench") to a second temperature that is below the Tg of the alloy to form the aforementioned composition, which can then be heated to be disposed and/or shaped. The rate of quenching and the temperature to be heated to can be determined by convention methods, such as utilizing the a Time-Temperature-crystal Transformation (TTT) diagram. The provided sheets, shot, or any shape feedstock can have a small critical casting thickness, but the final part can have thickness that is either thinner or thicker than the critical casting thickness.

Mold

Any suitable mold can be used for the forming/molding methods described herein. Also, a mold may not be needed. The mold can be made of any material and can have any shape. A mold can have many parts or one part. For example, as shown in FIG. 3(a), the mold can be an assembly of two separate parts. For example, the mold material can include an inorganic material, an organic material, or a combination thereof. The mold can include a metal, a metal alloy, a ceramic, or combinations thereof. The mold can also be a composite with various materials combined together or be of essentially one material.

Depending on the application, in some embodiments, the mold can include a material that has a softening temperature higher than the Tg of the composition that will be disposed thereon to form the interfacial layer. The softening temperature in the context of the mold can refer to the Tg thereof (in the case of an amorphous material) or the melting temperature Tm (in the case of a crystalline material). In the case of a mixture of an amorphous material and a crystalline material, the softening temperature can refer to the temperature at which the atoms in the material begin to become mobile, such as Tg or a temperature between Tg and Tm. In one embodiment, the mold can have a softening temperature that is higher than the crystallization temperature, or the melting temperature in some embodiments, of the amorphous alloy composition. In one embodiment, the mold can include a material that has a softening temperature that is above about 300° C.; for example, the mold can be used with a platinum-based alloy. In another embodiment, the mold can comprise a material that has a softening temperature that is above about 500° C.; for example, the mold can be used with a zirconium based alloy. The mold can comprise diamond, carbide (e.g., silicon carbide), or a combination thereof.

The mold can also have any suitable geometry, depending on the applications. For example, the mold can be a cylinder, a cube, a rectangular box, a sphere, an ellipsoid, a polyhedron, an irregular shape, or anything in between. The interior molding cavity of the mold (where the molding process takes place) can have the same shape as the exterior of the mold or a different shape. Depending on the application, the mold can be a part of an electronic device or any type of part that can utilize the benefits of having the molded product. An electronic device herein can refer to a cell phone, a laptop computer, a display, a desktop computer, or combinations thereof. The applications are described in detail further below.

After the forming/molding process is completed, the molded article can be removed from the mold. Alternatively, the mold itself can be a part of the final product with a layer of the amorphous alloy composition disposed thereon in the molding cavity. Accordingly, the mold can be a part of an electronic device having a cavity to facilitate the molding of an amorphous composition. In one embodiment, the mold and/or the other tools involved in the forming process can have the same or substantially the same microstructure as the composition to be formed or they can have different microstructures. For example, the mold can include a material that is crystalline, partially amorphous, substantially amorphous, or fully amorphous. As described above, the amorphous composition of the parts can be a homogeneous amorphous alloy or a composite having an amorphous alloy. In one embodiment, the composite can include an amorphous matrix phase surrounding a crystalline phase, such as a plurality of crystals. The crystals can be in any shape, including having a dendritic shape.

Molding

During the molding step, the composition can be heated to a temperature that is below the crystallization temperature Tx of the composition. This heating step can function as to soften the amorphous alloy without reaching the onset of crystallization (or melting). The first temperature can be slightly below the Tg, at the Tg, or above the Tg of the composition. In other words, the composition can be heated to (1) below the supercooled region or (2) within the supercooled region. In some embodiments, the composition can also be heated to be above the supercooled region. However, while the first temperature can be heated above the Tm, it is generally preferred to have the first temperature below or equal to Tx. FIG. 1 provides a flow diagram of an exemplary embodiment.

The molding processes described herein utilize fluids to accomplish the steps of heating, molding, and/or cooling. Accordingly, the molding process described herein in some embodiments can resemble a blow-molding process. For example, in one embodiment, the presently described molding process can resemble extrusion blow molding, injection blow molding, and/or stretch blow molding, each of which is known in the art. In one embodiment, the composition is molded into a predetermined shape, such as the shape of the molding cavity of the mold, by allowing a first fluid to be in contact with at least a portion of the composition. The first fluid can be at an elevated temperature such that the contact can allow the composition to be softened to commence molding. In one embodiment, the first fluid can be at the first temperature, as described above (below Tx). The composition can be molded into a predetermined shape that may or may not be the same as its pre-molding shape by being in contact with the first fluid. Once the composition has achieved the predetermined shape, the composition can subsequently be cooled by being in contact with a second fluid that is at a second temperature lower than the first temperature. This latter step can be accomplished by replacing at least some of the first fluid with the second fluid. Depending on the application and the amorphous alloy composition used, a mold might not be needed and the composition can be molded directly by the fluids.

As shown in FIG. 1, a first fluid at a first temperature can be used to heat the composition to the first temperature. The first temperature is preferably lower than the Tx of the alloy. The heated composition can be molded into a desirable shape, and the molding can take place at the first temperature. Subsequently, the heated composition can be cooled by a second fluid at a second temperature that is lower than the first temperature. For example, the second temperature can be lower than, equal to, or slightly above Tg. In some embodiments, a (mechanical) shaping pressure can be applied during the step of heating, molding, and/or cooling. The pressure can facilitate the transport of the softened amorphous alloy composition and the shaping thereof.

FIG. 2 provides a flow diagram to illustrate another exemplary embodiment. In this embodiment, the molding step can take place simultaneously as the alloy composition is being heated by the first fluid at a first temperature. Similar to the prior process, the molded composition can then be cooled by a second fluid at a second temperature. The second fluid can displace and/or replace at least some of the first fluid during the cooling process. As a result, in one embodiment, at least some of the first fluid is removed from being in contact with the composition during and/or after the cooling step.

Prior to the molding (and/or heating) step, the composition and/or mold (if there is one) can be at ambient temperature or can be preheated. For example, in one embodiment, at least one of (i) the composition and (ii) the mold can be preheated to an elevated temperature before the commencement of the molding step. The elevated temperature can be, for example, the first temperature (of the first fluid) or the second temperature (of the second fluid). The first and second fluids can be heated to their respective first and second temperatures during the forming process or they can already be at their respective temperature before the forming process begins. The composition prior to the heating step can be already in the mold or not in the mold. In other words, the composition can be heated while being in contact with mold. The preheated (and possibly softened, depending on the preheating temperature) composition can be viscous and thus can be disposed into the mold or can become mobile if already in the mold. In one embodiment, in addition to the composition, the surface of any or all of the parts of the mold and/or the tools that will be used during the process, can also be pre-heated to a temperature, such as to the first temperature. The tools can include, for example, a plunger or an instrument used for shaping, disposing, cutting, and/or polishing, such as a blade, a knife, a scrapping instrumentation, etc.

The composition can be brought to, above, or below its Tg such that the composition can be softened. Depending on the composition, the first temperature can vary, but in most embodiments it is below the Tx of the composition. As described above, the composition can also be pre-heated so that a heating step can be skipped. For example, the first temperature of the first fluid can be of any value(s) but can be below the softening temperature of the mold as described above. In one embodiment, the first temperature is less than equal to about 500° C., such as less than equal to about 400° C., such as less than equal to about 300° C.

The heating can be localized heating, such that only the interfacial region between the mold surface and the composition surface is heated. For example, only the surface region (interior surface and/or exterior surface) of the mold or tools (e.g., shaping tools) is heated to the first temperature. The region can refer to the top 50 microns or more, such as 100 microns or more, such as 200 microns or more, such as 400 microns or more, such as 800 microns or more, such as 1 mm or more, such as 1.5 mm or more, such as 2 mm or more, such as 5 mm or more, such as 1 cm or more, such as 5 cm or more, such as 10 cm or more. Alternatively, at least substantially all of the composition and the entire parts and shaping tools involved can be heated to the first temperature. The heating step can be carried out by any suitable techniques, such as with a laser, inductive heating, conductive heating, flash lamp, electron discharge, or combinations thereof. The heating time can depend on the chemical composition of the alloy. For example, the heating time can be less than or equal to 250 seconds, such as less than or equal to 200 seconds, such as less than or equal to 150 seconds, such as less than or equal to 100 seconds, such as less than equal to 50 seconds.

The first and second temperatures can depend on the amorphous alloy compositions. For example, the first temperature can be less than or equal to about 600° C., such as less than or equal to about 500° C., such as less than or equal to about 400° C., such as less than or equal to about 350° C., such as less than or equal to about 300° C., such as less than or equal to about 250° C., such as less than or equal to about 200° C., such as less than or equal to about 150° C. For example, in one embodiment wherein the alloy is a Zr-based alloy, the first temperature can be between about 330° C. and about 500° C. Alternatively, in a Pt-based alloy, the first temperature can be about 200° C. and about 330° C. As aforementioned, in some embodiments, the second temperature can be lower than the first temperature. Thus, the second temperature can be less than or equal to about 450° C., such as less than or equal to about 400° C., such as less than or equal to about 350° C., such as less than or equal to about 300° C., such as less than or equal to about 250° C., such as less than or equal to about 200° C., such as less than or equal to about 150° C., such as less than or equal to about 100° C. For example, in one embodiment wherein the alloy is a Zr-based alloy, the second temperature can be less than or equal to about 330° C. Alternatively, in a Pt-based alloy, the second temperature can be less than or equal to about 200° C.

The heating and cooling times can vary depending on the systems and application. In one embodiment, the heating time to allow the composition to reach the first temperature can be less than or equal to about 500 seconds, such as less than or equal to about 400 seconds, such as less than or equal to about 300 seconds, such as less than or equal to about 200 seconds, such as less than or equal to about 100 seconds, such as less than or equal to about 50 seconds, such as less than or equal to about 20 seconds, such as less than or equal to about 10 seconds. The cooling time can be the same as or different from the heating time. In some embodiments, the term "molding time" can refer to a sum of the heating time and cooling time.

The first fluid and the second fluid can be of any suitable fluids. They can be the same composition or different. For example, the first fluid or the second fluid can comprise a molten metal, a molten alloy, a liquid, a liquid mixture, a gas, a gas mixture, or combinations thereof. The fluid can have an organic material, an inorganic material, or both. Depending on the amorphous alloy compositions and the mold materials used, any metals or alloys can be used in the first and second fluids. For example, the metal or alloy can be one that would melt at a temperature below the Tg of the amorphous alloy composition. In one embodiment, for example, the metal or alloy can comprise, for example, the elements tin, lead, silver, or combinations thereof. The first and second fluids can also be liquid, such as an oil or steam (e.g., water). A suitable oil, including natural or synthetic, can also be used. The first and second fluids can also be air(s), which can be any of the inert gases, such as argon, helium, nitrogen, or mixtures thereof. Non-inert gas, such as ambient air, can also be used, if they are suitable for the application.

The cooling step can be carried out by replacing the first fluid with the second fluid, which can have a lower temperature than the first fluid. The replacement can be carried out by a pressure or force, such as by a gravitational force, or a suction force. The replacement can also be carried out by injecting the second fluid into the mold so that at least some of the first fluid can be displaced out of the mold or from the composition. More than one cooling fluid can be used. For example, a third fluid can be used to replace the second fluid after the second fluid cools the composition to the second temperature. The third fluid can have a third temperature even lower than the second temperature, or the third temperature can be higher then the second temperature but lower than the first temperature. A fourth, fifth, sixth, and so on fluid can be used in sequence to provide a step-mold/cooling process.

Figure 4A:
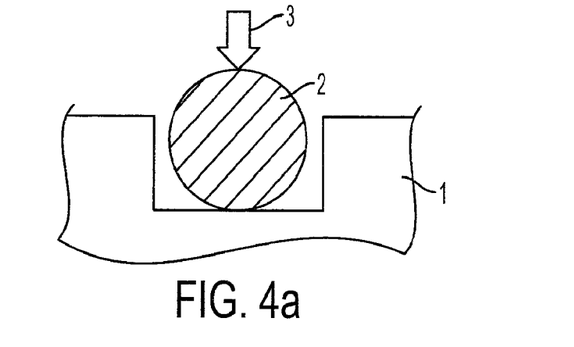
FIGS. 4(a)-4(d) are schematics providing an exaggerated illustration of such a molding process: the relative location between the composition and the mold is shown in (a); the introduction of a first fluid used to heat/mold the composition is shown in (b); the formation of a molded article conforming to the shape of the mold is shown in (c); and the introduction of a second fluid used to cool the composition is shown in (d).
Figure 4B:
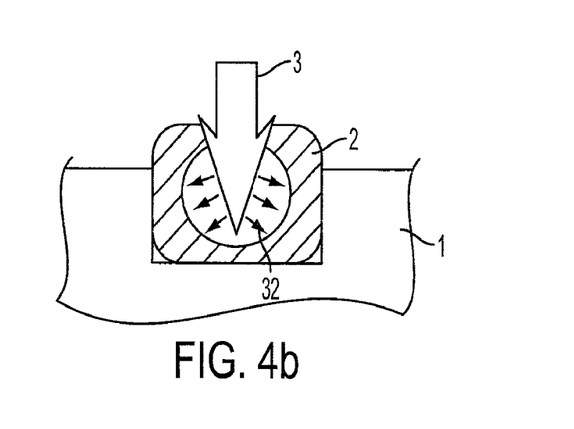
Figure 4C:
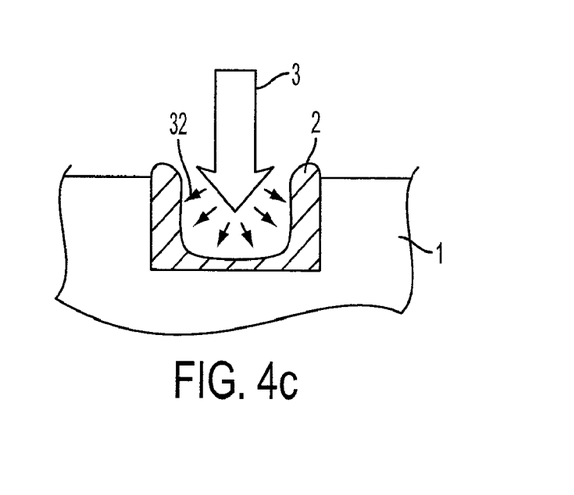
Figure 4D:
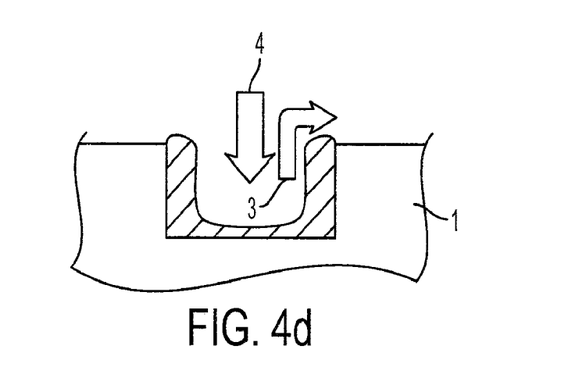

During molding, the first fluid can cause the composition to expand. FIGS. 4(a)-4(d) provide an exaggerated illustration of such a process. The alloy composition 2 in the mold 1 can be exposed to a first fluid 3. FIG. 4(a). It is noted that that the composition 2 need not be a sphere; rather, it can be of any geometry or size as described above. Similarly, the mold cavity need not be a rectangular box and can be of any geometry or size, as described above. The first fluid 3 then can cause the composition 2 to expand outwards, such as radially outwards, towards the surface lining of the mold 1. The expansion can be caused by, for example, a radially outward force (or pressure) 32 caused by the first fluid 3. FIG. 4(b). The radially outward force 32 can be controlled with respect to its magnitude and the direction during the molding step. As a result of the expansion and the force 32, the composition 2 can be pushed against the surface of the mold 1, thereby assuming the sample of the mold 1; FIG. 4(c). Subsequently, a second fluid 4 can be applied to cool the composition 2; the second fluid 4 can displace some of the first fluid 3 out of the mold (showing by an arrow leaving the mold). Because the amorphous alloy can form an intimate contact with the surface lining in the cavity, the molded article can be formed on the mold surface with no gap. The term "intimate contact" is described further below.

Figure 5A:
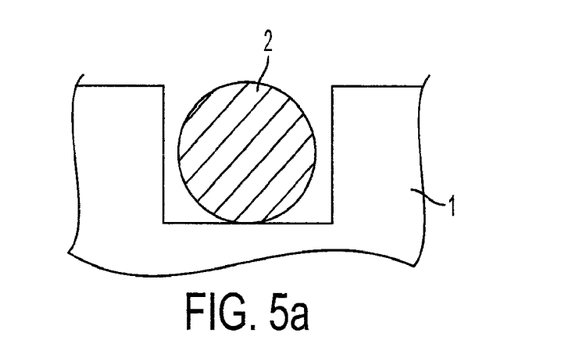
FIGS. 5(a)-5(b) provide a schematic illustration showing the various ways the first and/or second fluid can be in contact with the composition in one embodiment: the relative location between the composition and the mold is shown in (a)
Figure 5B:
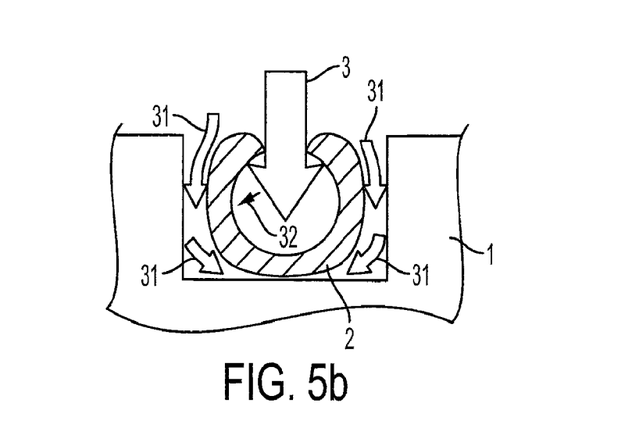

The first and/or second fluid can be in contact with the composition in more than one location and from more than one direction. FIGS. 5(a)-5(b) provide a schematic illustration in one embodiment. For example, the first fluid 3 can contact the composition 2 and cause it to expand radially outward, forming a cavity in the center of the composition; as a result, the molded article can be a hollow shape. The fluid 3 can contact the composition 2 from the hollow shape and push it outward with a radially outward pressure/force 32. Alternatively, the fluid can contact the outer surface of the composition and push the surface inward 31 inwards towards the center. FIG. 5(b). The direction need not be only inward or outward; rather, they can be in any direction, such as lateral, longitudinal, axial, and the contact between the first fluid can take place anywhere in, on, or surrounding the composition. Similarly, the second fluid can contact and/or drive the composition to move around in any direction and at any location.

The molded composition can then be cooled to harden or solidify. The cooling time can depend on the chemical composition of the alloy. In one embodiment where a pressure is applied to the composition and/or mold during the molding step, during the cooling step the pressure applied can be maintained. The pressure can be decreased, the same, or increased relative to that used in the disposing step. Accordingly, in one embodiment, with the aid of the applied pressure, the composition can continue to be shaped/molded during the cooling step.

Because of the intimate contact between the first fluid, the second fluid, and the composition, some of the elements from the first and/or second fluids may be incorporated into the alloy composition as the molding process progresses. In one embodiment, it can be desirable to avoid such an incorporation. As a result, in some embodiments, the molded article is substantially free of the elements from the first and/or second fluids. Also, because of the relatively low temperature needed to mold the article (in comparison to conventional process) and because of the type of composition used, little inter-diffusion of the chemical species between the mold and the amorphous alloy composition can take place.

An amorphous alloy composition can provide an intimate contact with the surface it is in contact with, thereby providing substantial conformity to the geometry to the contact surface. Intimate contact and conformity will be discussed below. Because of unexpectedly high conformity of the amorphous alloy composition, the molding can take place substantially free void or bubble formation as a result of air inclusion.

In FIGS. 3, 4, and 5, one could start with a preform with a cavity of some sort or a sheet or a wire. Preferably, one would not want to start with a solid piece of amorphous alloy to form a hollow part (such as a bottle). If the preform is a wire, one can stretch it to form a thinner or flatter wire, or curve it. If the preform is a sheet, one can stretch it to form a dome or a bottle.

Additional Processing Variations

The step(s) of heating, molding, and/or cooling can be carried out in at least partial vacuum, such as substantial vacuum, such as vacuum to prevent the composition from reacting with air. In one embodiment, the vacuum environment can be at about $10^{-2}$ torr or less, such as at about $10^{-3}$ torr or less, such as at about $10^{-4}$ torr or less. Alternatively, step(s) of heating, molding, and/or cooling can be carried out in an inert atmosphere, such as in argon or nitrogen.

As aforementioned, the composition prior to molding can be in contact with the surface of the mold or not. Thus, in one embodiment wherein multiple parts are involved, the step of molding can include disposing a heated composition onto the surface of the mold. The step of molding can further include additional processing steps. The molding time can depend on the chemical composition of the alloy and/or the disposing technique employed. The various time periods that can be involved have been described above. In one embodiment, the steps of molding and further processing can take place simultaneously. Alternatively, they can take place sequentially, with further processing, for example, following the disposing of the composition onto a surface.

In one embodiment, molding, including disposing, heating, shaping, etc., and/or cooling, can be carried out with a (mechanical) shaping pressure. The pressure can be created as a result of the different techniques used to process and dispose the composition, as described below. Depending on the application, the pressure can be applied in various ways, such as a shear pressure, a tensile pressure, or a compressive pressure. For example, the pressure can help push the soften alloy composition into a recessed surface or cavity of the mold so that the composition can form to the shape of the mold as it hardens (or solidifies). In one embodiment, the viscosity of an amorphous alloy in the supercooled liquid region can vary between $10^{12}$ Pa·s at Tg down to $10^5$ Pa·s at Tx, which is generally considered the high temperature limit of the supercooled region. The amorphous alloy in the supercooled region has high stability against crystallization and can exist as a highly viscous liquid. Liquids with such viscosities can undergo substantial plastic strain under an applied pressure. In contrast to solids, the liquid amorphous alloy can deform locally, which can drastically lower the required energy for cutting and forming. Thus, in one embodiment, the step of disposing can include thermoplastic forming. Thermoplastic forming can allow the application of a large deformation to the disposed amorphous alloy composition to facilitate shaping. The ease of cutting and forming can depend on the temperature of the alloy, the mold, and the cutting tool. As the temperature is increased the viscosity is reduced, allowing for easier forming.

Several techniques can be used to provide further processing during, or after, the step of disposing. For example, the step of disposing includes shaping or forming the amorphous alloy into a desired configuration. Shaping or forming can refer to rendering the liquid/softened composition into a desired shape before or as it solidifies. In one embodiment, the step of molding further can include conforming, shearing, extrusion, over-molding, over-casting, or combinations thereof, in at least one operation. In one embodiment, the further process step can include separating the molded article from the mold and/or polishing the surface of the molded article. Any combination of these techniques during further processing can be carried out simultaneously in one step or in multiple sequential steps.

For example, conforming can be performed by applying a pressure such that the shape of the amorphous alloy composition after solidification/hardening can form to a desirable shape, such as the shape of a portion of the part(s). In other words, if the amorphous alloy composition has a first shape, and the mold alloy composition has a second shape (the second shape can be different from the first shape), conforming can allow the first shape of the pre-shaped alloy composition to alter and change into the second shape (of the mold). Furthermore, in a case of the part being a mold, conforming can include pushing the liquid/softened composition into the cavity space of the mold (or a cavity of a part) so that after cooling the resultant molded article can take the shape of the cavity of the mold.

Shearing can be applied by applying a shearing force between the molded article. Shearing can be applied to facilitate moving and shaping the molded article and/or to facilitate the separation of the resultant molded article (after solidification) from the mold. Extrusion can be applied, for example, to further shape a solidified/cooled molded article into a predetermined shape or size. Alternatively, extrusion can be applied during the step of disposing so that the composition can take the shape of the extrusion die (or mold) as it is disposed into the die and thereafter solidifies. Over-molding, or over-casting, can be applied, for example, to remove excess molded article from the surface of the part or to facilitate transferring of the softening composition into the recessed surface (e.g., cavity, undercut, etc.) of the part.

In one embodiment, further processing steps can be applied to the molded article after the cooling step is completed or during cooling. For example, over-molding can be applied to scrap off or trim excess materials of the resultant molded article; for example, the excess can be the portion protruding out of the cavity or undercut of the part(s). Additional steps such as separating the molded article and/or part by mechanical force, such as shear force, can be applied to separate/remove the products, including the molded article, from the mold or some parts; for example, degating. In one embodiment, additional steps of cutting the molded article and/or the mold it is in contact with into desired size and geometry can be applied. The cutting step can be carried out, for example, with a heated blade. In one embodiment, during cutting, only the blade is heated, or both the blade and the molded article to be cut are heated by any of the aforedescribed methods.

It is noted that because the amorphous composition should not have acquired any crystalline phase in most embodiments, the cooling need not be as fast as that needed to make an amorphous alloy. The composition can be cooled to below the Tg of the composition, such as finally to the ambient temperature. The resultant cooled composition is at least partially amorphous, such as at least substantially amorphous, such as completely amorphous. In one embodiment where there are two metal parts, the amorphous alloy molded article can create a mechanical interlock between the two metal parts, with little inter-diffusion of the metal species from the parts into the molded article.

In some embodiments, the heating history of an amorphous alloy can be cumulative. Thus, the steps of heating, disposing, and cooling can be repeated many times, as long as the total heating time in the heating history is less than that which would trigger crystal formation. This can provide an unexpected benefit of having the ability to reshape, remold, and/or re-bond the molded article and the parts.

Furthermore, the presently described methods allow the articles to be molded at a lower temperature than conventional methods. Also, the presently described methods surprisingly can allow the molding to take place with very small volume shrinkage during the cooling step; this is in stark contrast to the convention molding methods. In one embodiment, the volume shrinkage (of the formed molded article relative to the composite disposed onto the surface of a part) can be less than about 1%, such as less than about 0.8%, such as less than about 0.6%, such as less than about 0.5%, such as less than about 0.3%, such as less than about 0.2%, such as less than about 0.1%, such as less than about 0.09%. Such a small volume shrinkage can allow an intimate contact between the molded article and the mold part(s); as a result, the molded article can be impermeable to fluid, as described above.

One additional advantage of using the amorphous alloy as molding composition is that the amorphous alloy, while being shaped/molded, does not chemically attack or corrode the surface of the parts. In other words, there is minimal interdiffusion of the chemical species or elements between the mold and the composition. In one embodiment, presently described methods and the molded article formed do not permit the elements of the mold from dissolving and/or diffusing into the molded article formed. As a result, the resultant molded article is substantially free of the elements from the part it is in contact with, unless the element is a common element already present in the alloy composition in the molded article before the step of disposing.

For example, as a result of the forming method aforedescribed, minimal diffusion of elements from the parts occurs. Thus, the molded article is substantially free of any elements diffused from the part(s), such as entirely free of any elements diffused from the part(s). This can have the benefit of avoiding contamination of the molded article and/or erosion of the mold surface(s). In the case of the molded article sharing some common elements with the part(s), this lack of diffusion refers to the diffusion of the elements from the part(s), as opposed to the presence of the common elements already present in the molded article.

Applications

Because of the high aspect ratio and/or hollow shape of the molded article formed by the presently described methods, the article can be used in a variety of applications. For example, the article can be a part of a hollow part such as a bottle-shaped structure or thin sheet. The hollow part can be a three-dimensional hollow part, comprising a shape defined by a thin layer (or layers) in all three dimensions, such as one that is shown in FIG. 3(c). The article can be a thin sheet such as one used for encapsulation. The article can also be as a part of a hologram added to another device or part to increase security. Alternatively, it can be a part of an electronic device, such as, for example, a part of the housing of the device or an electrical interconnector thereof. For example, in one embodiment, the molded article can be used to connect and bond two parts of the housing of an electronic device and create a molded article that is impermeable to fluid, effectively rendering the device water proof and air tight such that fluid cannot enter the interior of the device.

An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed:

1. A method of forming an article comprising a bulk amorphous alloy, the method comprising:
   providing in a mold a parison having a first shape, the parison comprising a material having a glass transition temperature Tg and a crystallization temperature Tx;
   providing a first fluid at a first temperature that is between Tx and Tg, and providing a second fluid at a second temperature that is below the first temperature;
   molding the parison into a second shape by having the first fluid contact at least a portion of the parison; and
   cooling the parison to form the article having the second shape by replacing at least some of the first fluid with the second fluid.

2. The method of claim 1, wherein at least one of (i) the mold and (ii) the parison is at the second temperature before the step of molding.

3. The method of claim 1, wherein the parison comprises an alloy that is at least substantially amorphous, a composite comprising an alloy at least substantially amorphous, or a combination thereof.

4. The method of claim 1, wherein the parison comprises Zr, Hf, Ti, Cu, Ni, Pt, Pd, Fe, Mg, Au, La, Ag, Al, Mo, Nb, or a combination thereof.

5. The method of claim 1, wherein the mold is at the first temperature or the second temperature.

6. The method of claim 1, wherein, during the step of molding the first fluid causes at least a portion of the parison to expand outwards.

7. The method of claim 1, further comprising heating the mold to the first temperature or the second temperature.

8. The method of claim 1, wherein the first fluid comprises a molten metal, a molten alloy, a liquid, a liquid mixture, a gas, a gas mixture, or a combination thereof.

9. The method of claim 1, wherein the second fluid comprises a molten alloy, a liquid, a liquid mixture, a gas, a gas mixture, or a combination thereof.

10. The method of claim 1, wherein the first temperature is less than or equal to about 500° C.

11. The method of claim 1, wherein the second temperature is less than or equal to about 350° C.

12. The method of claim 1, wherein at least one of (i) the step of molding and (ii) the step of cooling is carried out with a pressure.

13. The method of claim 1, wherein the mold has a third shape, and the second shape of the article substantially conforms to the third shape.

14. The method of claim 1, wherein the article has an aspect ratio of at least 10.

15. A method of forming an article comprising a bulk amorphous alloy, the method comprising:
   heating a first fluid to a first temperature and heating at least one of (i) a second fluid and (ii) a parison having a first shape to a second temperature that is below the first temperature, wherein the parison comprises a material that is at least partially amorphous and has a glass transition temperature Tg and a crystallization temperature Tx, and wherein the first temperature is below Tx and above Tg;
   molding the parison into a second shape by having the first fluid contact at least a portion of the parison; and
   cooling the parison to form the article having the second shape by replacing at least some of the first fluid with the second fluid.

16. The method of claim 15, further comprising replacing at least some of the second fluid with a third fluid.

17. The method of claim 15, where the step of molding substantially limits air bubble formation.

18. The method of claim 15, wherein the step of molding further comprises allowing the parison to reach the first temperature in less than or equal to about 400 seconds.

19. The method of claim 15, wherein the step of molding is carried out in at least partial vacuum, in an inert atmosphere, or both.

20. The method of claim 15, wherein the steps of heating, molding, and cooling are repeated at least once.

21. A method of forming an article comprising a bulk amorphous alloy, the method comprising:
   providing a parison in a mold, the parison comprising a material that is at least partially amorphous and has a glass transition temperature Tg and a crystallization temperature Tx;
   heating a first fluid to a first temperature that is below Tx, and heating at least one of (i) a second fluid, (ii) the mold, and (iii) the parison to a second temperature that is below the first temperature, wherein the second temperature is below Tg;
   molding the parison by having the first fluid contact at least a portion of the parison;
   cooling the parison to form the article by replacing at least some of the first fluid with the second fluid; and
   removing at least some of the second fluid.

22. The method of claim 21, wherein during the step of molding, the first fluid is in contact with the parison in a plurality of locations.

23. The method of claim 21, further comprising post-molding processing of the article.

24. The method of claim 21, wherein the article has a three-dimensional hollow shape.

25. The method of claim 21, wherein the article is a part of an electronic device.

26. The method of claim 1, wherein a composition of the first fluid is the same as that of the second fluid.

27. The method of claim 1, wherein a composition of the first fluid is different from that of the second fluid.

* * * * *